Dec. 24, 1940.     H. R. KUHNS     2,226,312
JOINT AND SEAL THEREFOR
Filed July 6, 1940

Inventor
Hayes R. Kuhns
By Charles W. Hills
Attorney

Patented Dec. 24, 1940

2,226,312

UNITED STATES PATENT OFFICE 2,226,312

JOINT AND SEAL THEREFOR

Hayes R. Kuhns, Killbuck, Ohio

Application July 6, 1940, Serial No. 344,274

7 Claims. (Cl. 285—115)

This invention relates to the joining of pipe sections in bell and spigot assemblies, such as the joints in water mains carrying potable water.

It has heretofore been an almost universal practice to make water main joints by inserting a dam of hemp or jute in the bell and about the forward end of the spigot, and then pouring melted lead or the like behind the dam to fill the bell to its lip.

The dam of hemp or jute is inexpensive, but since joints are frequently made in muddy surroundings, in wet weather, and in holes that contain much mud and water after a failure of a water main, the hemp or jute is often in a dirty condition when yarned into the bell.

Workmen have used pieces of old sacking or old rope when clean hemp was not readily available for making the dam.

It is well known that the chlorination of water mains having joints formed with hemp or jute dams produces very unsatisfactory results, because the chlorine does not appear to penetrate the hemp, and bacteria grow readily on the hemp when the chlorine disappears.

Because rubber dams are generally more sterile than hemp dams, there has been heretofore a very limited use of rubber dams in the form of rings or sleeves, but besides being more expensive than hemp dams, they have been more difficult to apply by ordinary workmen accustomed to the almost universal practice of yarning hemp, and have not superseded the hemp dam.

It is an important object of this invention to provide a rubber yarn that can be readily yarned by ordinary workmen to provide a relatively sterile and very tight dam.

It is a further object of this invention to provide a bell and spigot joint for water mains and the like that may be made in less time and with less effort than heretofore, while possessing the great practical advantages of being relatively inexpensive, being relatively sterile, and being tighter than joints employing hemp or jute dams.

It is a further object of this invention to provide a method of joint making to the end that water main joints may be made quickly and easily by ordinary workmen, so that an inexpensive, sterile, and tight joint can be made.

It is a further object of this invention to provide a longitudinally stretchable soft rubber yarn to facilitate the making of sterile and very tight joints in water mains by ordinary workmen.

Other and further objects of this invention will be apparent from the disclosure in the specification and the accompanying drawing.

In the drawing:

Figure 1 shows a bell and spigot joint assembly for water mains, with parts in section, and with parts broken.

Figure 2 also shows the bell and spigot assembly of Figure 1, but with a modified form of yarn.

Figure 1:
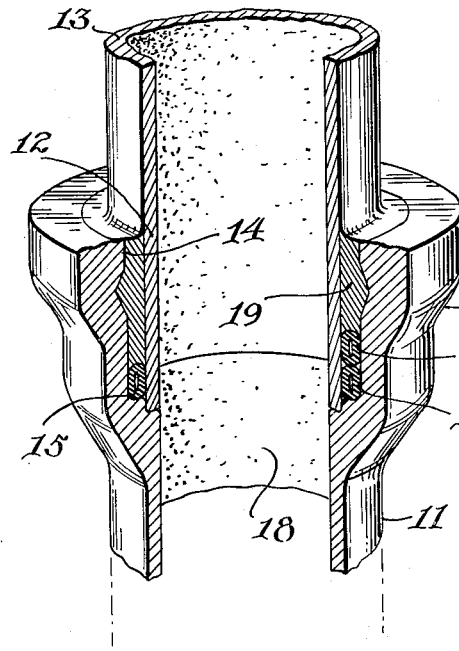

In Figure 1, there is shown a conventional bell 10 which is the female end of a pipe 11, and a conventional spigot 12 which is the male end of a pipe 13. The bell and spigot are shown in assembled relation in a joint of a water main, and each has a portion cut away to show their sections, and to show the space for packing which is defined between the outer face of the spigot and the inner face of the bell. In the conventional bell and spigot assembly, the packing space is irregular in section, being narrow at the upper end, then enlarged immediately below an inwardly directed top lip 14 of the bell, and again narrow at the lower end of the packing space.

In a joint made according to the present invention, a dam formed of a length of tubular rubber packing 15 is laid at the bottom of the packing space, and in Figure 1 this packing is shown as it appears when laid with a bottom layer 16 and an overlapping portion 17.

The normal roughness of the cast iron pipe is indicated at 18.

The packing 15 is merchandised in long lengths, much as rope is merchandised, and it is referred to hereinafter as rubber yarn, to distinguish it from rubber rings which have heretofore been proposed as a joint packing.

The yarn 15 is of soft and elastic rubber tubing having a thick wall, and has a diameter greater than the width of the packing space, so that it is flattened and becomes oval when in place in the joint, as shown in Figure 1.

Photographs and a description of the joints of this application have appeared in Water Works Engineering, volume 92, No. 12, page 778; in Engineering News-Record, volume 122, No. 23, pages 788 and 789; and in Water Works and Sewage, volume 86, No. 5, pages 175 and 176.

When the pipe 11 is lying buried in the ground and the spigot 12 of a length of new pipe is to be inserted in a bell exposed in a hole or ditch when a water main is to be repaired, the rubber yarn 15 of a normal diameter substantially greater than the width of the packing space about a centered spigot is chosen and is cut to a length to encircle the spigot and provide overlapping ends. An intermediate portion of the length of yarn is placed in the mouth of the bell or held against the spigot, the spigot is held up near the top of the bell by a rope held by a man on the top of the ditch, and the man in the ditch pushes the spigot home in the bell with the entering spigot readily rolling the yarn home with it. The yarn simply rolls along the bell, while its free ends turn freely so that there is no tearing or permanent twisting and contracting of the rubber, as there would be if it were formed in an endless ring. The yarn also rides freely over the rough surface of the cast iron pipe. If necessary, the intermediate portion of the yarn is pushed home with a yarning tool.

After the spigot is pushed home, its weight is then taken by the yarn, and the yarn is thereby compressed to automatically center the spigot in the bell.

The two free ends of the length of packing project from the bell, and the free end of what is to be the lowermost portion 16 of the packing is grasped with one hand by the jointer, and pulled to stretch the rubber to a diameter such that it can be easily pushed home by a blunt yarning tool in the other hand after the intermediate portion is anchored by the weight of the spigot. When a substantial portion of the stretched length has been pushed home, the jointer releases the grasped end, and the packed portion contracts longitudinally while naturally expanding diametrally to accommodate itself to every surface irregularity of the bell and spigot. Next, the remaining free end is grasped and stretched, and the remaining portion is yarned home to overlap the end of the lowermost portion. Again, when a substantial length of the remaining portion has been yarned home, its free end is released and yarned home while it contracts longitudinally and expands diametrally to make a very tight joint.

When all of the rubber has been yarned home, a filler 19 of molten lead or the like is poured behind it to fill the bell to its lip.

Excellent joints can be quickly made by ordinary workmen, and as reported in Water Works and Sewage, in the February, 1940, issue, water mains of lengths joined in the manner just described show a leakage of from 60% to 80% of the allowable leakage of 100 gallons per day per inch-mile.

Since the bore of the yarn is filled with air, the tubing forms a cushion, and it provides what is known as a drop-tight dam for the hot lead poured against it.

The water pipe about the joint and the yarn itself are advantageously swabbed with some germicidal agent immediately prior to the placing of the yarn in the joint, and it has been found that the rubber yarn is eminently satisfactory in preventing the growth of bacteria at the joint.

The rubber yarn 15 is of a kind that stretches and compresses readily, so the jointer may well choose a yarn having a normal diameter or section very substantially greater than the section of the packing space in the bell, since he knows that he can reduce the diameter of the yarn by stretching the yarn, and so make it a simple matter to push the yarn home with a blunt yarning tool held in the hand.

Should he choose a yarn with a normal diameter slightly in excess of the section of the joint space, he can readily push the yarn home with a blunt yarning tool, because of the resiliency of the tubular yarn. If a portion of the packing space is unduly constricted because of irregularities of bell and spigot surface, or because of canting of the spigot, he can readily get the yarn home without great effort by stretching the yarn. Also, when the spigot is off center, a tapered drift chisel can be inserted in the bell to push the spigot and squeeze the inserted rubber to leave room for the rubber being inserted.

The tubing is very desirable when a new length of pipe is being entered into an existing bell of a length of buried pipe, as when repairs are being made to water mains, for it provides an elastic bearing for the spigot and facilitates the positioning of the spigot in the bell to provide the joint space. Since the ends of the length of packing are free, there is not the permanent twist and contraction of material and possible tearing of the material as when rubber rings are used.

Figure 4:
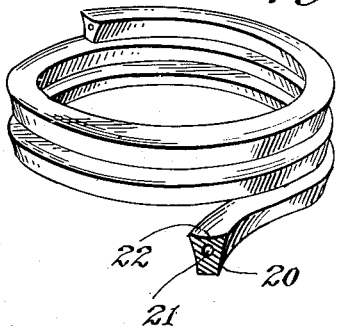
Figure 4 is a perspective view of a length of the type of yarn used in the assembly of Figure 2, and showing an end of the yarn in section.
Figure 5:
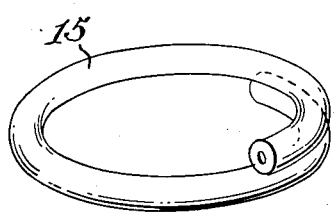
Figure 5 is a perspective view of a length of yarn to show overlapping of the ends of the yarn in a length of yarn for use in a joint assembly according to the present invention.

When special T's or crosses are used in the repair to the water main, a wedge-shaped rubber yarn 20 shown in Figure 4 is used. The wedge-shaped yarn 20 may be provided with a longitudinally extending bore 21 in the thickest or head portion 22 of the wedge. This yarn 20 is of the same material as the yarn 15.

In laying out new work during which lengths of new pipe can be jointed on the surface of the ground to be dropped into an open ditch, or when there is ample room in an open ditch to readily handle and support lengths of pipe to be jointed, the wedge-shaped yarn is particularly advantageous in use.

With the spigot properly centered in the bell, and a length of yarn cut for the joint, the narrow edge of the yarn is entered in the bell, and the first layer, or an appreciable portion of it, can be readily pushed home with a yarning tool, for although the thick portion of the wedge exceeds the width of the packing space, the longitudinal bore in the head portion facilitates the deforming of the yarn and the working of the yarn into the joint space. Then, with one portion of the length of yarn anchored at the bottom of the bell, the other portion may be stretched and readily pushed home with a yarning tool, as heretofore described in connection with the round tubular yarn.

A size of yarn may be used with the thickest portion having a transverse length well in excess of the width of the packing space because the longitudinal bore facilitates working of the yarn into the bell, and the stretched rubber can be readily worked into the bell even though there is somewhat less room for the second or overlapping portion of rubber due to irregularities on the faces of the bell and spigot or due to a slight canting of the pipes.

Figure 2:
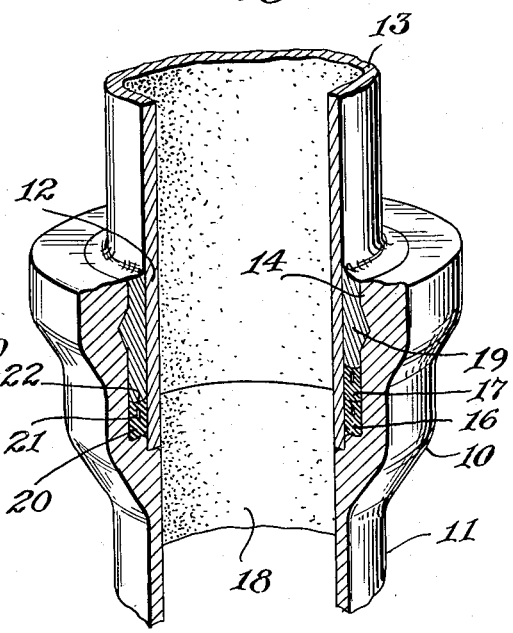
Figure 3:
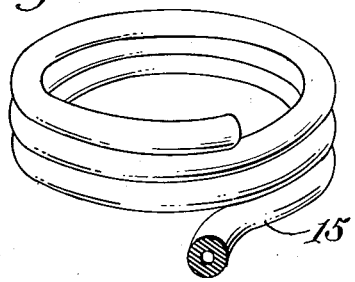
Figure 3 is a perspective view of a length of the type of yarn used in the assembly of Figure 1, and showing an end of the yarn in section.

When the stretched rubber is released, it contracts longitudinally and expands diametrally and makes a very tight joint. A bell and spigot assembly with wedge-shaped yarn is shown in Figure 2.

Whether the round yarn or the wedge-shaped yarn is used, the joint is made with much less effort, and in much less time, than when hemp is used. There is no risk of workmen using old rope or pieces of sacking instead of hemp, and because the rubber fills up all voids due to irregularities of the surfaces of the bell and spigot, a very much tighter joint is had than when hemp is used, for hemp requires much pounding and the fibers often break into short lengths when pounded.

After the wedge-shaped yarn is pushed home, with a top portion overlapping the end of the lower layer, a suitable compound 19 is poured into the bell, and it has been found that the rubber yarn is drop-tight, or in other words, makes a perfect dam for the poured material, and also forms a cushion for the poured material because air is trapped in the bore of the yarn.

While the rubber yarn has been described in connection with the jointing of water mains because it eliminates many of the hazards to health incidental to joint making with the conventional hemp, and because its use results in joints practically free from bacteria growth in water mains, it is obviously well adapted to the making of joints in soil pipes and in terra cotta pipes where it is desired that a very tight joint be made with the least possible effort.

It has been found best to yarn the portion of the yarn below the spigot somewhat ahead of the upper portion.

It will be readily appreciated by those familiar with the jointing of water mains that the surfaces of the spigot and bell in the packing space are often rough and irregular, so that the packing space is far from being uniform. The rubber yarn of this invention is soft and readily compressible and stretchable, so that it can be yarned home readily without tearing, to conform to every irregularity and make a very tight joint. Use of wedges, and the like, is not necessary, because of the ease with which the pipe can be manipulated by a drift chisel, since the pipe bears against compressible rubber.

I claim as my invention:

1. In a bell and spigot joint for water mains and the like which includes a bell and a spigot in the bell defining a packing space with said bell to receive a poured packing of lead or the like, a rubber dam in the packing space and disposed about the forward end of the spigot, said dam comprising a length of longitudinally stretchable soft rubber yarn substantially longer than the circumference of the spigot and disposed encircling the spigot with one end portion overlying the other end portion.

2. In a bell and spigot joint for water mains and the like which includes a bell and a spigot in the bell defining a packing space with said bell to receive a poured packing of lead or the like, a rubber dam inserted in the packing space and disposed about the forward end of the spigot, said dam comprising a length of longitudinally stretchable soft rubber yarn substantially longer than the circumference of the spigot and having a normal diameter greater than the width of the narrowest portion of the packing space occupied by the yarn, said yarn being adapted to be inserted by reducing the diameter of the yarn by tension applied to an end portion as the yarn is being fed into the packing space.

3. In a bell and spigot joint for water mains and the like which includes a bell and a spigot in the bell defining a packing space with the bell to receive a poured packing, a rubber dam inserted in the packing space and disposed about the forward end of the spigot, said dam comprising a length of longitudinally stretchable wedge-shaped soft rubber yarn substantially longer than the circumference of the spigot and with one end portion overlying the other end portion, said yarn having a normal width at the thickest portion of the wedge greater than the width of the narrowest portion of the packing space occupied by the yarn and being provided with a longitudinally extending bore.

4. In a bell and spigot joint for water mains and the like which includes a bell and a spigot in the bell defining a packing space with the bell to receive a poured packing, a rubber dam inserted in the packing space and disposed about the forward end of the spigot, said dam comprising a length of longitudinally stretchable wedge-shaped soft rubber yarn substantially longer than the circumference of the spigot and with one end portion overlying the other end portion, said yarn having a normal width at the thickest portion of the wedge greater than the width of the narrowest portion of the packing space occupied by the yarn and being provided with a longitudinally extending bore in its head portion.

5. In a bell and spigot joint for water mains and the like which includes a bell and a spigot in the bell defining a packing space with the bell, a rubber packing inserted in the packing space, said packing comprising a length of longitudinally stretchable tubular soft rubber yarn substantially longer than the circumference of the spigot and with one end portion overlying the other end portion, said yarn having a normal diameter greater than the width of the narrowest portion of the packing space occupied by the yarn and being adapted to be inserted into position in the joint by reducing the diameter of the yarn by tension applied to the end portion as the yarn is being fed into the packing space.

6. A bell and spigot joint for water mains and the like, said joint comprising a bell and a spigot in the bell defining a packing space with the bell, a rubber dam in the packing space and disposed about the forward end of the spigot for direct contact with water carried by the main, said dam comprising a length of longitudinally stretchable soft rubber yarn substantially longer than the circumference of the spigot and disposed encircling the spigot with one end portion overlying the other end portion, said yarn having a normal diameter greater than the width of the narrowest portion of the packing space occupied by the yarn and being adapted to be inserted by reducing the diameter of the yarn by tension applied to one end as the yarn is fed into the packing space, and a packing engaging said dam and disposed in the rear end of the packing space.

7. A bell and spigot joint for water mains and the like, said joint comprising a bell, a spigot in said bell and defining a space for packing therewith, and a dam formed of a length of rubber yarn substantially longer than the circumference of the spigot, and having a portion intermediate its free ends initially seated on said bell and near the mouth of the bell for rolling movement of the yarn along the bell as the spigot is pushed home in the bell, the end portions of the yarn being disposed outwardly of said bell while the intermediate portion of the yarn is being rolled with the moving spigot, and being entered in said bell after said spigot is pushed home with one end portion overlapping the other end portion when in assembled relation to the spigot.

HAYES R. KUHNS.